US 6,585,110 B2

(12) United States Patent
Layne et al.

(10) Patent No.: US 6,585,110 B2
(45) Date of Patent: Jul. 1, 2003

(54) MODULAR CONVEYOR SYSTEM WITH SIDE FLEXING BELT HAVING ROLLER SUPPORT

(75) Inventors: James L. Layne, Bowling Green, KY (US); Michael D. McDaniel, Glasgow, KY (US); Mark T. Johnson, Glasgow, KY (US); Wendell S. Bell, Smiths Grove, KY (US)

(73) Assignee: Span Tech LLC, Glasgow, KY (US)

( * ) Notice: Subject to any disclaimer, the term of this patent is extended or adjusted under 35 U.S.C. 154(b) by 0 days.

(21) Appl. No.: 10/009,282

(22) PCT Filed: Apr. 12, 2001

(86) PCT No.: PCT/US01/11923

§ 371 (c)(1),
(2), (4) Date: Dec. 3, 2001

(87) PCT Pub. No.: WO01/79085

PCT Pub. Date: Oct. 25, 2001

(65) Prior Publication Data

US 2003/0075419 A1 Apr. 24, 2003

Related U.S. Application Data

(63) Continuation-in-part of application No. 09/548,160, filed on Apr. 13, 2000.

(51) Int. Cl.[7] ................................................ B65G 17/06
(52) U.S. Cl. ........................ 198/852; 198/853; 198/845; 198/838
(58) Field of Search ................................ 198/852, 853, 198/845, 838

(56) References Cited

U.S. PATENT DOCUMENTS

| | | | |
|---|---|---|---|
| 1,480,067 A | 1/1924 | Heinkel | |
| 2,524,186 A | 10/1950 | Beninger | |
| 2,860,766 A | 11/1958 | Welter | |
| 2,920,734 A | 1/1960 | Heinrich | |
| 2,938,614 A | 5/1960 | Hewitt, Jr. | |
| 2,961,087 A | 11/1960 | Reading | |
| 2,992,717 A | 7/1961 | Putman, Sr. | |
| 2,999,604 A | 9/1961 | Chalich | |
| 3,036,695 A | 5/1962 | Thuerman | |
| 3,285,395 A | 11/1966 | Resener | |
| 3,512,627 A | 5/1970 | Hodlewsky et al. | |
| 3,513,964 A | 5/1970 | Imse | |
| 3,520,398 A | 7/1970 | Thomson | |
| 3,550,756 A | * 12/1970 | Kornylak | 198/183 |
| 3,575,282 A | * 4/1971 | Gaiotto et al. | 198/177 |
| 3,605,993 A | 9/1971 | De Rozario | |

(List continued on next page.)

FOREIGN PATENT DOCUMENTS

| | | |
|---|---|---|
| DE | 1070097 | 5/1960 |
| DE | 1149665 | 5/1963 |
| DE | 8436734 | 12/1984 |
| GB | 856.532 | 12/1960 |

*Primary Examiner*—Christopher P. Ellis
*Assistant Examiner*—Rashmi Sharma
(74) *Attorney, Agent, or Firm*—King and Schickli, PLLC

(57) ABSTRACT

A modular link conveyor system (10) for transporting articles is provided having a plurality of modular link sections (15) providing a support surface for the articles and wherein one or more rollers (30) are positioned in the underside of selected link sections (12) to provide support by rolling on a guide rail (25, 26) of the conveyor system (10). Each link section (12) includes at least one interengaging apex (13) and leg portion (14) having a matching hole (22) and slot (21) for receiving a transverse rod (20) to permit side flexing action. An enclosure (36, 37) for each roller (30) provides protective encapsulation along at least the two sides and substantially around the rolling face to prevent debris build up. Advantageously, at least one roller (30) is mounted in each side link section (13, 14) that also provides a depending arm (28) and transverse tab (29) for lateral guiding action. The link sections (15) are combined to form a composite link and a cover plate provides an extended support surface.

15 Claims, 5 Drawing Sheets

U.S. PATENT DOCUMENTS

| | | | |
|---|---|---|---|
| 3,621,986 A | 11/1971 | Webb et al. | |
| 3,628,647 A | 12/1971 | Beard | |
| 3,669,241 A | 6/1972 | Chalich | |
| 3,669,247 A | 6/1972 | Pulver | |
| 3,672,488 A | 6/1972 | Collins | |
| 3,674,130 A | 7/1972 | Carmichael | |
| 3,701,413 A | 10/1972 | Leahy et al. | |
| 3,770,096 A | 11/1973 | Stohlquist | |
| 3,776,349 A | 12/1973 | Kampfer | |
| 3,804,232 A | 4/1974 | Freiwald et al. | |
| 3,842,968 A | 10/1974 | Owens | |
| 3,880,276 A * | 4/1975 | Willett, III | 198/193 |
| 3,894,627 A | 7/1975 | Jabbusch et al. | |
| 3,910,404 A | 10/1975 | Henrekson | |
| 3,944,037 A | 3/1976 | Stease | |
| 3,944,059 A | 3/1976 | Garvey | |
| 4,067,428 A | 1/1978 | Shuttleworth | |
| 4,096,943 A | 6/1978 | Gentsch | |
| 4,202,441 A | 5/1980 | Bourgeois | |
| 4,231,469 A * | 11/1980 | Arscott | 198/779 |
| 4,271,960 A | 6/1981 | Chalich | |
| 4,436,200 A | 3/1984 | Hodlewsky et al. | |
| 4,765,455 A | 8/1988 | Matsuno et al. | |
| D299,424 S | 1/1989 | Schroeder et al. | |
| D299,425 S | 1/1989 | Schroeder et al. | |
| 4,821,869 A * | 4/1989 | Hodlewsky | 198/779 |
| 4,836,357 A | 6/1989 | Focke | |
| 4,852,722 A * | 8/1989 | Houseman | 198/803.7 |
| 4,880,107 A * | 11/1989 | Deal | 198/779 |
| 4,909,380 A * | 3/1990 | Hodlewsky | 198/779 |
| 4,953,693 A * | 9/1990 | Draebel | 198/853 |
| 4,993,540 A * | 2/1991 | van Capelleveen | 198/779 |
| 5,031,757 A * | 7/1991 | Draebel et al. | 198/852 |
| 5,076,422 A * | 12/1991 | Clopton | 198/838 |
| 5,096,050 A * | 3/1992 | Hodlewsky | 198/779 |
| 5,119,926 A | 6/1992 | Draebel et al. | |
| 5,224,583 A * | 7/1993 | Palmaer et al. | 198/779 |
| 5,238,099 A * | 8/1993 | Schroeder et al. | 198/456 |
| 5,261,525 A * | 11/1993 | Garbagnati | 198/779 |
| 5,307,923 A * | 5/1994 | Damkjaer | 198/852 |
| 5,330,045 A * | 7/1994 | Hodlewsky | 198/779 |
| 5,404,997 A * | 4/1995 | Schreier et al. | 198/779 |
| 5,573,105 A * | 11/1996 | Palmaer | 198/853 |
| 5,655,667 A | 8/1997 | Isaacs | |
| 5,706,934 A * | 1/1998 | Palmaer et al. | 198/853 |
| 5,775,480 A * | 7/1998 | Layeyre et al. | 198/831 |
| 5,797,820 A * | 8/1998 | Endo | 474/230 |
| 5,806,653 A * | 9/1998 | Ahls et al. | 198/326 |
| 5,909,797 A * | 6/1999 | Van Den Goor | 198/370.02 |
| 5,911,306 A * | 6/1999 | Ferrari | 198/836.1 |
| 6,070,711 A * | 6/2000 | Murano et al. | 198/779 |
| 6,079,552 A * | 6/2000 | Reichert et al. | 198/852 |
| 6,148,990 A * | 11/2000 | Lapeyre et al. | 198/779 |
| 6,209,714 B1 * | 4/2001 | Lapeyre et al. | 198/779 |
| 6,209,716 B1 * | 4/2001 | Bogle et al. | 198/852 |
| 6,241,082 B1 * | 6/2001 | Vanmeenen et al. | 198/845 |
| 6,253,911 B1 * | 7/2001 | Layne et al. | 198/85 |
| 6,364,095 B1 * | 4/2002 | Layne et al. | 198/852 |

\* cited by examiner

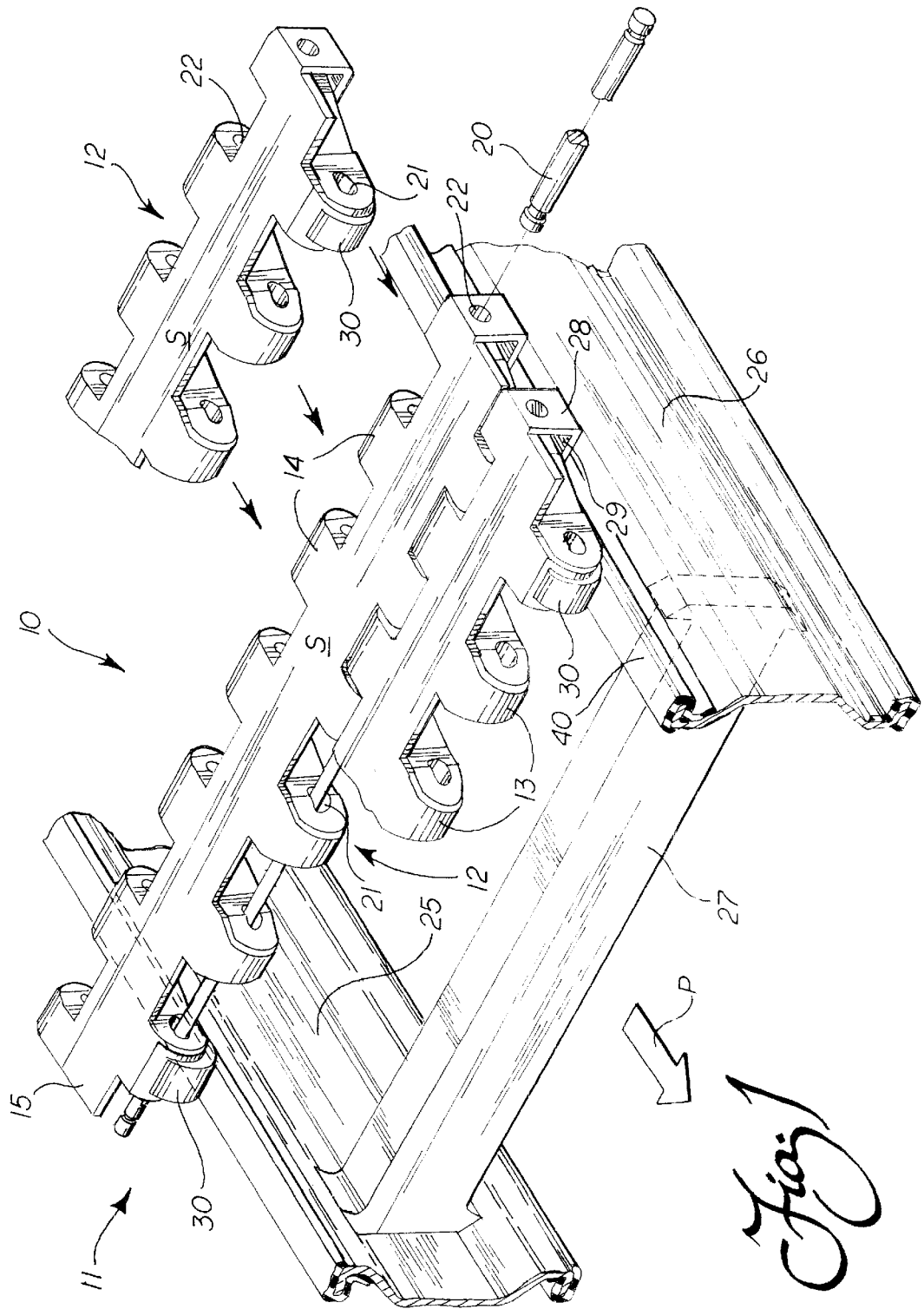

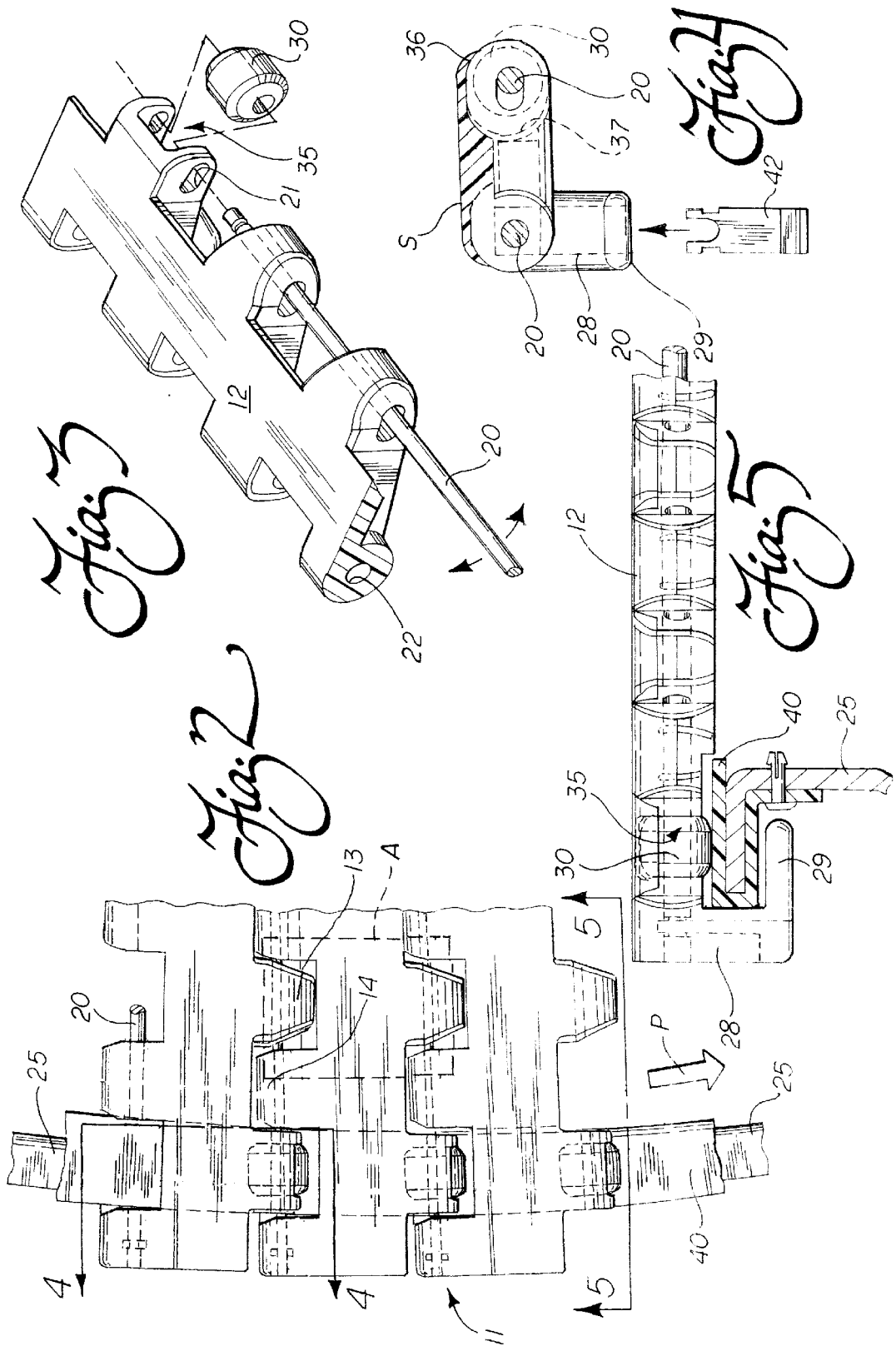

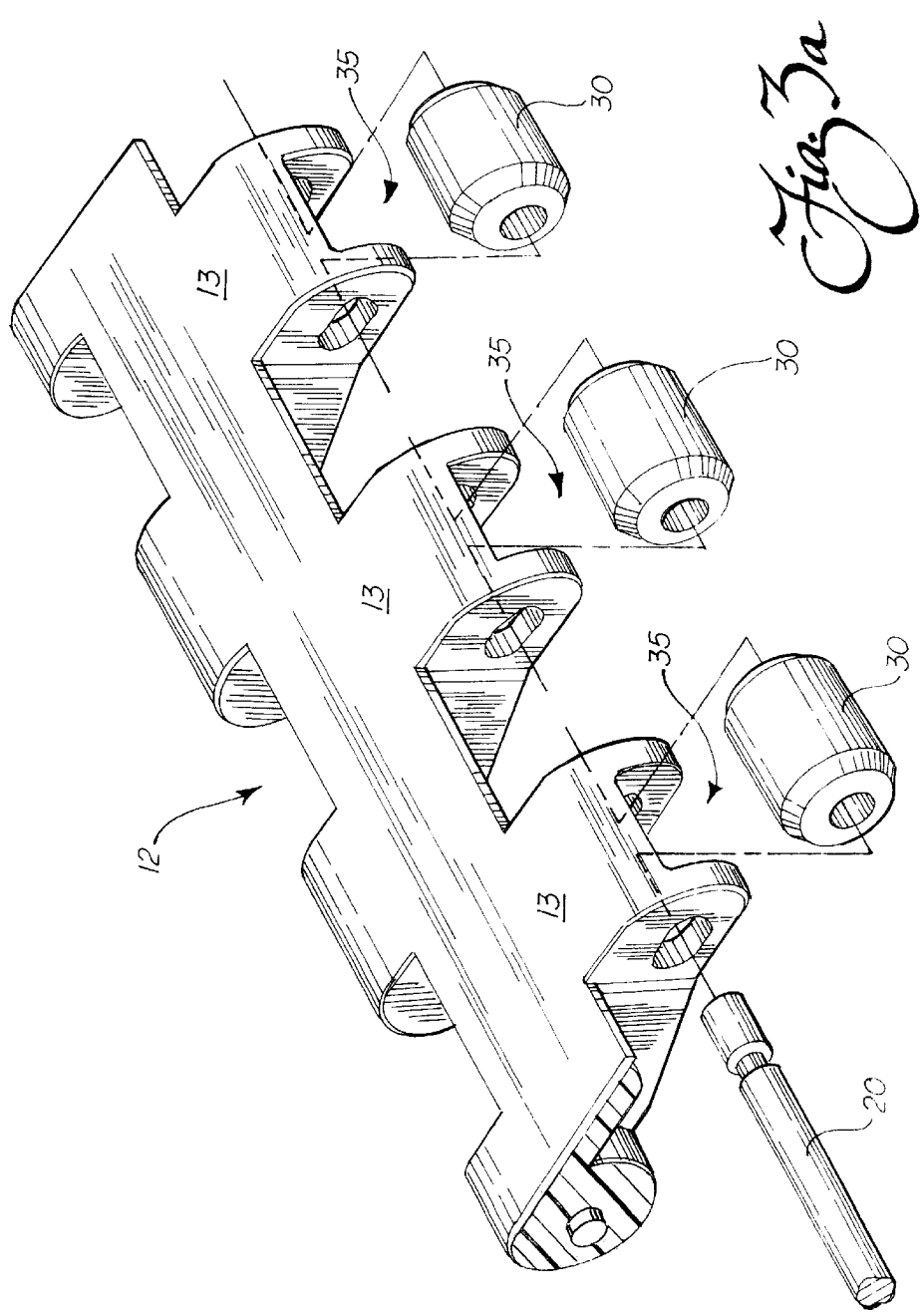

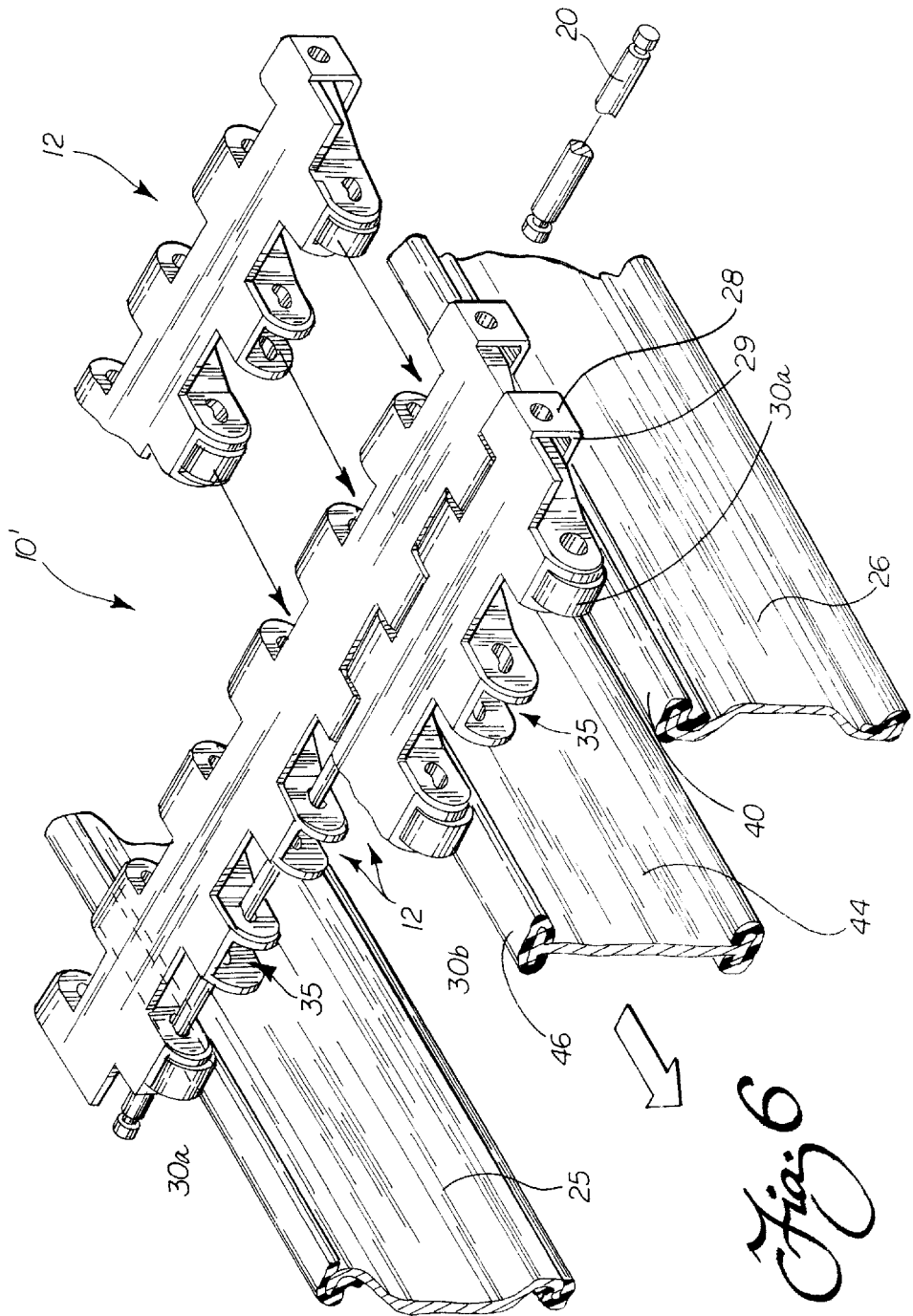

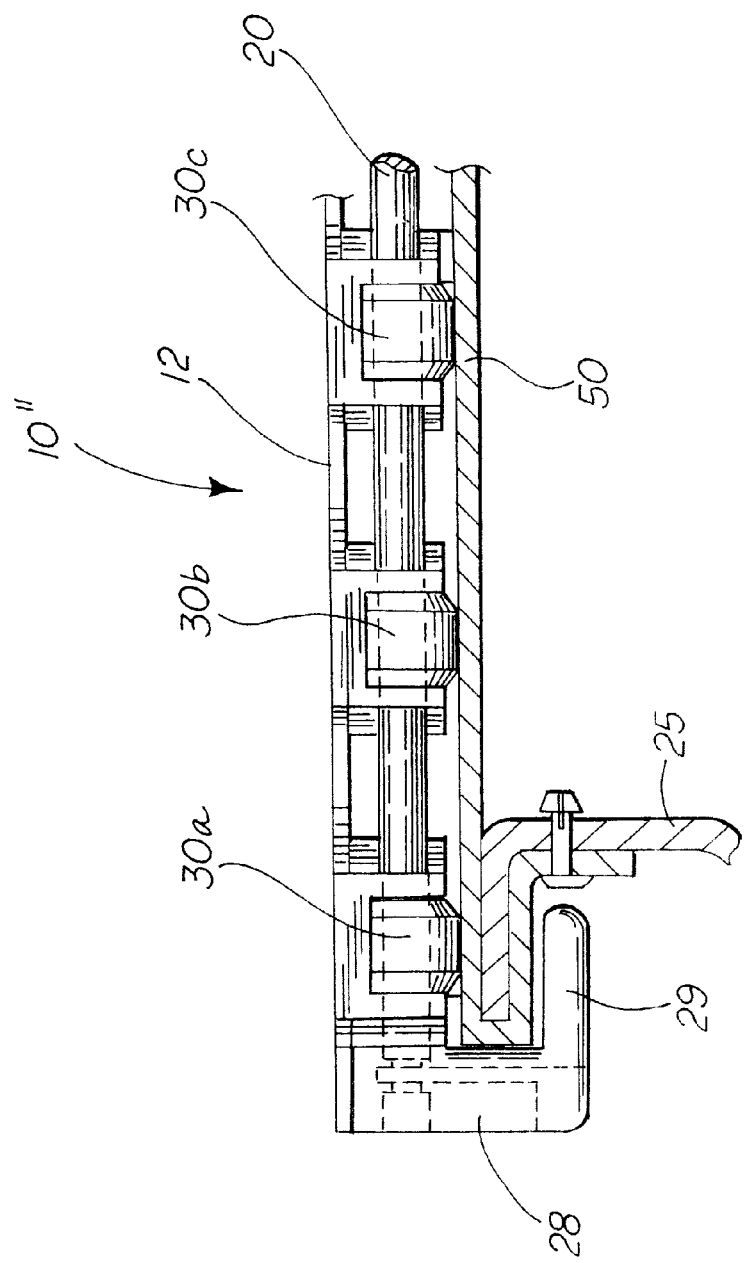

MODULAR CONVEYOR SYSTEM WITH SIDE FLEXING BELT HAVING ROLLER SUPPORT

Under U.S. law, this is a continuation-in-part of application Ser. No. 09/548,160, filed Apr. 13, 2000, the disclosure of which is incorporated herein by reference.

TECHNICAL FIELD

The present invention relates to modular link conveyor systems, and more particularly to a conveyor system including a side flexing belt comprised of links with one or more roller supports.

BACKGROUND OF THE INVENTION

The use of side flexing modular link conveyors in the food processing industry enjoys increasing popularity. Particularly for conveying food articles or products, especially in packages or in semi-packaged form, the modular link conveyor represents the overwhelming choice of food processors. In the recent past, there have been significant advances in the development of such conveyors so as to provide more efficient handling of an even larger variety of food articles, packages and containers, as well as other types of articles and products.

One of the most popular types of modular link conveyor systems on the market today, if not the most popular, is The Designer System, manufactured and sold by the assignee of the present invention, and illustrated and claimed in prior U.S. Pat. No. 4,953,693, Sep. 4, 1990 and U.S. Pat. No. 5,031,757, issued Jul. 16, 1991. Since the time of these early patents in the art, the significant advances have been fast in coming to provide an even more efficient operation and better handling and transporting of articles and products.

One such advance is the provision of side mounted rollers for smoothly guiding the side flexing conveyor belt around curves, such as illustrated and claimed in co-pending application Ser. No. 09/131,587, filed Aug. 10, 1998 entitled "External Guide Assembly for Reducing Conveyor Belt Drag" and assigned to the assignee of the present invention. Specifically, stationary mounted spindles with idler rollers adjacent the curves have proven to be highly effective in reducing the side drag along the path. This advantageously serves to somewhat reduce the driving power requirements, as well as the modular link wear attributed to the lateral forces. Others have proposed providing openly mounted rollers carried on the modular links themselves, and acting against the inside of an upstanding rail in an attempt to accomplish the same result, as illustrated in U.S. Pat. No. 5,775,480, issued Jul. 7, 1998.

There also exists in the prior art relating to chain conveyors, the provision for rollers for supporting the chain, as well as for lateral guiding action. Each chain link mounts the rollers in the open, and upper and lower guide tracks are provided, as set forth for example in a U.S. Patent No. to Clopton 5,076,422, issued Dec. 31, 1991. A similar, but much earlier arrangement providing both support and lateral guiding of a conveyor chain is shown in the Gaiotto et al. U.S. Pat. No. 3,575,282 issued Apr. 20, 1971.

Thus, while support/guide rollers mounted on chain conveyors have been successfully tried for almost two decades, a need is identified for providing a successful arrangement for support rollers mounted on the conveyor belt in a modular link conveyor system. So far, such a solution has escaped those working in the conveyor technology. If such an advance in modular conveyors is to take place, it must compliment the effective guiding action achieved by the side rollers mounted along the guide rails, and thereby enhance the overall operation of the conveyor system.

SUMMARY OF THE INVENTION

In accordance with the purposes of the present invention as described herein, an improved modular link conveyor system and a side flexing belt for transporting articles along a longitudinal path are provided. The belt may comprise a plurality of modular link sections that extend in both the longitudinal and transverse directions, with each unique link section including interengaging apex and leg portions. A transverse connector extends through matching apertures to provide the side flexing action. An extended support surface for the transported articles is provided on the upper side of the links. At least one, but preferably multiple, spaced support rollers are provided in an enclosure on the underside of at least one portion of a corresponding link section. Preferably, the enclosure is formed in at least one apex of the modular link section, but may also be formed in each apex present during molding to enhance the design flexibility. The roller may be aligned and specially adapted for rolling on a longitudinally extending support surface, such as a rail. The rail gives a very efficient support arrangement for the weight of the conveyor belt and transported articles. As a result, smooth, substantially friction free support of the belt is obtained, even when the number and weight of the articles being handled is significantly increased. This enhancement also advantageously serves to both minimize the power driving requirements and significantly reduce the wear on the link sections.

Because each roller is mounted in an enclosure, debris build up around the roller, such as inadvertent spillage from transported food products, is minimized. The enclosure in accordance with the preferred embodiment extends in close proximity to the two sides of the roller and along at least the upper roller face. For the greatest effectiveness, the enclosure forms a curved cap having a lip and depending skirt covering substantially 180° of the rolling face of the roller.

In the case of a support rail, a support or wear strip fabricated of plastic is provided to create a smooth track surface for the support roller to roll on. Preferably, the modular link sections of the conveyor belt are molded of low cost, polypropylene plastic, whereas the roller and this support strip are formed of high strength, wear resistant plastic, such as acetyl or Nylon. An alternative to a support rail or the like is to merely provide a flat, plate-like support structure for engaging the roller(s).

At least one support roller may also be mounted in a modular side link section for assisting in guiding the conveyor belt. A depending arm and transverse tab are provided on each of these sections to engage the side and lower faces of the rail or other support structure so as to double for providing lateral guiding action of the belt. Preferably, at least two side by side, integral modular link sections form a composite link, which in turn establishes an extended upper support surface for the articles being transported. As a result, smaller items, such as bottle caps, are particularly adapted for transporting on the conveyor system. The extra smooth operation generated by the roller support feature, that thus eliminates any tendency for the support surface to vibrate and cause such small articles to move on the surface, adds to the desirability of the conveyor system of the present invention.

The transverse connector to form the belt is preferably a plastic or metal rod that extends through a slot or oversized opening in the apex portion and a hole in the leg portion. As should be appreciated, this arrangement allows for the desirable smooth, side flexing action. Lock elements carried by the side link sections may be used to couple the rod to the belt.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is an exploded perspective view illustrating a conveyor belt having link sections with mounted rollers for movement in a longitudinal direction along side support rails and thus forming the modular link conveyor system of the present invention;

FIG. 2 is a partial top view showing the manner in which the link sections with support rollers riding on a support rail allows side flexing action and promoting a particularly smooth operation;

FIG. 3 is an exploded perspective view of a cut-away composite link illustrating the mounting of the roller in the enclosure of the side link section by the transverse rod;

FIG. 3a is an enlarged, partially exploded perspective view of a modular link section wherein an enclosure for a support roller is provided in each apex;

FIG. 4 is a cross sectional view taken along line 4—4 of FIG. 2 and illustrating the lock element for the transverse rod in a position to be installed;

FIG. 5 is a partial front view of the composite link and including a cross sectional view through the support rail and strip mounted on the support rail of the frame of the conveyor system;

FIG. 6 is an exploded perspective view of an alternate embodiment wherein the conveyor belt comprises link sections with mounted rollers for movement in a longitudinal direction along both side support rails and an intermediate rail, and thus forming a modular link conveyor system; and FIG. 7 is a partial front view of the composite link and including a cross sectional view through the support rail and a plate-like support surface for engaging the rollers carried in multiple enclosures on the link.

Reference will now be made in detail to the present preferred embodiment of the invention, an example of which is illustrated in the accompanying drawings.

DETAILED DESCRIPTION OF THE PREFERRED EMBODIMENT

In the overall schematic illustration of FIG. 1, the basic components of a modular link conveyor system 10 constructed in accordance with the principles of the present invention are shown. A belt 11 is made up of interconnected composite links 12. A partial composite link 12 is shown in exploded view to reveal additional detail. A plurality of modular link sections within the composite link 12 comprises interengaging apex portions 13 and leg portions 14. It will be recognized that the basic structure of the composite links 12 may be similar to the links set forth in my two basic patents, U.S. Pat. Nos. 4,953,693 and 5,031,757, the disclosures of which are incorporated herein by reference. While the composite links 12 illustrated in FIG. 1 include four inside modular link sections and two side link sections, it is to be understood that any number of sections can be utilized depending primarily on the width of the conveyor desired. Also, while the link sections of the composite link 12 are integrally connected to each other in the illustrated preferred embodiment, it is to be understood that the link sections can be separate, but integrally connected, as used in the belts shown in my previous patents. It is preferred that the link sections be interengaged at the apex and leg portions 13, 14 so as to be capable of forming the conveyor belt 11. An extended support surface S is formed across the top of each composite link 12. As shown in FIGS. 1 and 2, the usual gaps associated with modular links are eliminated, so that small articles can be transported.

Each of the interengaging apex and leg portions 13, 14 are connected by a transverse connector 20. Matching apertures, such as a slot 21 and hole 22, are provided in each of the apex portions 13 and the leg portions 14, respectively. As illustrated in FIG. 1, the transverse connector 20 is in the form of a rod. It can be fabricated of plastic, metal, or composites thereof, and is inserted from one end in the manner indicated, after each pair of the composite links are assembled, all as indicated by the action arrows in FIG. 1.

As best illustrated in FIG. 2, because of the relationship of the slot 21, the hole 22 and the rod 20, the belt 11 is capable of limited side flexing action. Thus, even if the conveyor system 10 is intended for essentially straight conveying movement, slight misalignments along the longitudinal path can be easily accommodated. The side-flexing capability of the belt 11 also facilitates the negotiation of curves in the conveyor system 10.

The conveyor system 10 also includes at least two side support rails 25, 26, which along with the cross bar 27 form a part of the frame of the system 10. As illustrated, the support rails 25, 26 are parallel and extend longitudinally along a path P intended for transporting the articles. In this regard, note the depiction of an article A, illustrated by dashed line outline, in FIG. 2. The side link sections include a depending arm 28 and inwardly extending lip 29 to provide for lateral guidance along the path P, as well as during a return run (not shown), if present. As should be appreciated, the belt 11 may be driven in either direction along a forward or return run.

In accordance with an important aspect of the present invention, at least one support roller 30 is provided in the underside of selected link section(s). The rollers 30 in the preferred embodiment are in the side link sections aligned with the corresponding side rails 25 or 26 and are rotatably mounted by the transverse connector rod 20. Accordingly, the rollers 30 rotate in response to the engagement with the top surface of the rails 25, 26. As will be realized, with this arrangement, the rollers 30 effectively support the weight of the conveyor belt 11, as well as the weight of any articles A being conveyed. The rollers 30 thus provide a smooth, substantially friction free conveying movement along the feed path P. This particular arrangement minimizes power driving requirements and link wear. Furthermore, the positioning of the roller 30 in the side link section and underneath the extended support surface S is effective to protect the roller from inadvertent spillage, and thus prevent debris build up and potential conveyor jams, as has been a problem in the past.

With reference now more specifically to FIG. 3, each roller 30 is actually mounted by the connector rod 20 in an enclosure, generally designated by the reference numeral 35 (also see FIG. 5, as well FIGS. 3a, 6, and 7 showing an embodiment where more than one enclosure is provided in each link section). In accordance with the preferred arrangement, the two sides of the roller 30, as well as the upper roller face, are mounted in close proximity to the inside walls of the enclosure 35. As best illustrated in FIG. 4, the enclosure includes a curved cap including a lip 36 as an extension of the support surface S. Also, a curved skirt 37 extends behind the roller 30 to complete the protective encapsulation. Indeed, the curved cap formed by the lip 36 and the skirt 37 covers substantially 180° of the rolling face of the roller. As a result, any spilled food product is deflected away and minimal contamination results, thus reducing the normal cleaning requirements, such as may be required at the end of each operation shift.

To provide a smooth surface upon which the roller 30 is engaged, a support strip 40 may be on top of each of the guide rails 25, 26 (see in particular FIG. 5). The roller 30 and the support strip 40 are preferably molded of high strength, wear resistant plastic, such as acetyl, Nylon or equivalent materials. On the other hand, the composite link 12 may be molded from low cost, polypropylene plastic, or its equivalent. This combination provides a more efficient overall conveyor system 10 in terms of cost, as well as in superior performance.

As illustrated in FIG. 4, the rod 20 has a notch on each end to receive lock element 42. The depending arm 28 and the lip 29 of the end link section is guided in the lateral direction by engaging the side and bottom faces formed by the strip 40, as illustrated in FIG. 5. As mentioned above, the main function of the support strip 40 is to form a track for each of the rollers 30, to thus assure the desired low friction and virtually vibration free conveying movement is attained.

The present invention also includes the modular link conveyor belt 11 per se, as well as the modular link section per se including the support rollers 30. In each instance, the features described above provide the same desirable functionality and advantages.

With reference now to FIGS. 3a, 6 and 7, two possible alternate embodiments of the conveyor system 10 of the present invention are illustrated. In the first possible alternate embodiment, as shown in FIG. 3a, each link section is molded such that the apex 13 is provided with an enclosure 35, such as during the molding or other forming process. The construction of the composite link 12 is essentially as described above, but it should be appreciated that a roller 30 may now be provided in the apex 13 of each link section and coaxially supported by a common transverse rod 20. The roller 30 may be constructed in the manner similar to that described above in order to create the desired low-friction contact with the corresponding support surface, such as guide rails 25, 26.

A system 10' wherein more than one apex 13 is provided with a roller 30 is shown in FIG. 6. The conventional side or guide rails 25, 26 are provided for engaging the rollers 30a provided at the corresponding sides of the link 12. However, an intermediate roller 30b is provided in a second of the enclosures 35, as is a corresponding guide rail 44 for engaging this roller. Like guide rails 25, 26, the guide rail 44 may be provided with a wear strip 46 for engaging the roller 30b. A cross bar (not shown) or the like may also be used to support the rails 25, 26, 44.

Using this system 10', it should be appreciated that the friction reduction is even greater, which may allow the belt to accommodate an even greater load. It should also be appreciated that by providing a plurality of rollers and a plurality of intermediate guide rails (not shown), it is possible to provide a modular link belt 11 of essentially infinite width, while fully retaining the desirable properties associated with a narrower width belt having only one or a pair of support rollers.

A second embodiment of a system 10" wherein the belt 11 is formed of link sections having an enclosure 35 formed in each apex 13 is shown in FIG. 7. In this embodiment, it is preferable to provide a roller 30 in each enclosure 35, such as rollers 30a, 30b, and 30c. Instead of a narrow guide rail 25 with a wear strip, a stable support surface 50 is provided for simultaneously engaging and supporting each of the rollers 30a–30c. The support surface 50 maybe in the form of a metal or plastic platform, including one fabricated of a material having enhanced tribological characteristics, and may be provided with strategically positioned slots or apertures to facilitate cleaning. The guiding function is still preferably provided by a depending arm 28 carrying an inwardly projecting transverse tab 29. As with the previous embodiment, the provision of multiple rollers 30a–30c serves to further increase the ability of the belt 11 to handle loading without a linear increase in wear and friction (especially at lower speeds).

In summary, the modular link conveyor system 10, the conveyor belt 11 and the modular link section of the present invention bring about superior results and advantages not previously realized. One or more rollers 30 are positioned in the underside of the corresponding side link sections and provide friction free, smooth rolling action on the support rails 25, 26. The full weight of the belt 11, as well as the articles A, are supported. The belt 11 of the invention is particularly useful where the support surface S on the upper side is fully extended as illustrated. As a result, even small articles A, such as bottle caps can be successfully transported. On the other hand, because of the friction free movement, the versatility of the conveyor system 10 is enhanced and lends itself to conveying even heavier. than normal articles A. The transverse connector rod 20 is utilized to accommodate side flexing and to rotatably mount the roller 30 in each side link section. The enclosure 35 for each roller 30 provides full protective encapsulation, and thus maximum protection against debris build-up. The provision of an enclosure in only one or each and every apex 13 provided in a link section 11 is possible, as is the use of multiple guide rails 25, 26, 44 or a single-plate like support or guide surface 50.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A modular link section for a conveyor belt adapted to engage a support surface for transporting articles along a longitudinal path comprising:
   a body including at least one leading apex having a pair of spaced sidewalls and a partially curved connecting wall defining a cavity;
   at least one support roller positioned at least partially in the cavity and rotatably mounted to be adapted for rolling on said support surface,
   wherein said connecting wall covers a portion of said roller but a leading face thereof remains exposed;

whereby said roller provides smooth, substantially friction free support for enhancing conveying movement along said path to minimize power driving requirements, debris build-up and wear.

2. The modular link section of claim 1, including at least two side-by-side bodies that are integral with each other to form a composite link.

3. The modular link section of claim 1, wherein said support roller is mounted in a side link section having a depending arm and transverse tab for providing lateral guiding action of said belt.

4. The modular link section of claim 1, further including a plurality of support rollers provided in the underside of said body.

5. The modular link section of claim 1, wherein each support roller is mounted in a separate enclosure in said body.

6. A modular link section for a conveyor belt adapted to engage a support surface for transporting articles along a longitudinal path comprising:
- a body forming a conveying surface and including a plurality of leading and trailing apexes;
- at least one support roller in the underside of at least two of said leading apexes and rotatably mounted to be adapted for rolling on said surface,
- whereby said rollers provide smooth, substantially friction free support for enhancing conveying movement along said path to minimize power driving requirements, debris build-up and wear.

7. A modular link section for a conveyor belt adapted to engage a support surface for transporting articles along a longitudinal path, comprising:
- a body including at least one portion having a pair of spaced sidewalls and a partially curved connecting wall defining a cavity;
- at least one support roller positioned at least partially in the cavity and rotatably mounted to be adapted for rolling on said support surface,
- wherein said connecting wall covers a portion of said roller but a leading face thereof remains exposed;
- whereby said roller provides smooth, substantially friction free support for enhancing conveying movement along said path to minimize power driving requirements, debris build-up and wear.

8. The modular link section of claim 7, including at least two side-by-side bodies that are integral with each other to form a composite link.

9. The modular link section of claim 7, wherein said support roller is mounted in a side link section having a depending arm and transverse tab for providing lateral guiding action of said belt.

10. The modular link section of claim 7, further including a plurality of support rollers provided in the underside of said body.

11. The modular link section of claim 7, wherein each support roller is mounted in a separate enclosure in said body.

12. A modular link section for a conveyor belt adapted to engage a support surface for transporting articles along a longitudinal path, comprising:
- a body forming a conveying surface and including a plurality of leading and trailing apexes;
- at least one support roller in the underside of at least two of said leading apexes and rotatably mounted for rolling on said surface,
- whereby said rollers provide smooth, substantially friction free support for enhancing conveying movement along said path to minimize power driving requirements, debris build-up and wear.

13. A conveyor system, comprising:
- a conveyor belt including at least one modular link section having a body forming a conveying surface and including a plurality of leading apexes;
- at least one support roller rotatably mounted in the underside of each of said leading apexes,
- a guide surface for engaging each said roller;
- whereby said rollers provide smooth, substantially friction free support for enhancing conveying movement along said path to minimize power driving requirements, debris build-up and wear.

14. The system according to claim 13, wherein a roller is provided in at least three of said apexes and said guide surface is provided by at least three guide rails corresponding to the roller in each of said apexes.

15. The system according to claim 13, wherein the support surface is substantially planar and unitary.

* * * * *

UNITED STATES PATENT AND TRADEMARK OFFICE
CERTIFICATE OF CORRECTION

PATENT NO.    : 6,585,110 B2
DATED         : July 1, 2003
INVENTOR(S)   : James L. Layne et al.

It is certified that error appears in the above-identified patent and that said Letters Patent is hereby corrected as shown below:

<u>Column 8,</u>
Line 42, please replace "support" with -- guide --.

Signed and Sealed this

Ninth Day of December, 2003

JAMES E. ROGAN
*Director of the United States Patent and Trademark Office*